United States Patent
Matsumoto et al.

(10) Patent No.: US 8,223,763 B2
(45) Date of Patent: Jul. 17, 2012

(54) NODE DEVICE AND LABEL MANAGEMENT METHOD IN OPTICAL TRANSMISSION NETWORK

(75) Inventors: Takehiko Matsumoto, Tokyo (JP); Shuichi Iida, Tokyo (JP); Tomoshige Funasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 965 days.

(21) Appl. No.: 12/167,355

(22) Filed: Jul. 3, 2008

(65) Prior Publication Data
US 2009/0010645 A1  Jan. 8, 2009

(30) Foreign Application Priority Data
Jul. 4, 2007  (JP) ................................. 2007-175705

(51) Int. Cl.
*H04L 12/28* (2006.01)
(52) U.S. Cl. ........ 370/389; 370/225; 370/242; 370/392; 370/462
(58) Field of Classification Search .................. 370/225, 370/227, 242, 254, 255, 389, 392, 400, 462
See application file for complete search history.

(56) References Cited

U.S. PATENT DOCUMENTS

| | | | |
|---|---|---|---|
| 6,697,329 B1 * | 2/2004 | McAllister et al. ............ | 370/235 |
| 7,209,656 B2 * | 4/2007 | Peddanarappagari et al. .. | 398/38 |
| 2003/0161633 A1 * | 8/2003 | Oki et al. ........................ | 398/57 |
| 2004/0103209 A1 | 5/2004 | Kinoshita et al. | |
| 2006/0056412 A1 * | 3/2006 | Page .............................. | 370/392 |
| 2006/0153496 A1 * | 7/2006 | Tanobe et al. .................... | 385/24 |
| 2006/0193332 A1 * | 8/2006 | Qian et al. ..................... | 370/397 |
| 2007/0212068 A1 * | 9/2007 | Miyazaki et al. ............... | 398/57 |

FOREIGN PATENT DOCUMENTS

| | | |
|---|---|---|
| AU | 747375 B2 | 5/2002 |
| JP | 2004179894 A | 6/2004 |
| JP | 2006352297 A | 12/2006 |

OTHER PUBLICATIONS

European Search Report for EP Application No. 08252284.8 completed Nov. 6, 2008.
European Communication for EP Application No. 08252284.8 dated Mar. 23, 2012.

* cited by examiner

*Primary Examiner* — Ayaz Sheikh
*Assistant Examiner* — Andrew C Lee (57) ABSTRACT

A node device in an optical transmission network where a manually set path and an ADP (autonomous decentralized protocol) set path coexist, wherein the manually set path is set by centralized control and the ADP set path is set by autonomous decentralized processing, the node device including: a label memory for storing at least first labels used for manually set paths and second labels used for ADP set paths, wherein the first and second labels previously defined before path setting; and a resource manager for setting a manually set path and an ADP set path by referring to contents stored in the label memory.

24 Claims, 12 Drawing Sheets

PATH SETTING LABEL INFORMATION
STORAGE SECTION 14

| | LB1 | LB2 | LB3 | LB4 | LB5 |
|---|---|---|---|---|---|
| LINK L01 | 1 | 0 | 2 | 2 | 2 |
| LINK L02 | 0 | 0 | 1 | 1 | 1 |
| LINK L03 | 0 | 1 | 0 | 1 | 1 |

PATH MANAGEMENT METHOD NUMBER;
0: LABEL FOR MANUALLY SET PATH
1: LABEL FOR ADP SET PATH
2: SHARED LABEL

PATH SETTING LABEL INFORMATION
STORAGE SECTION 14

|      | LB1 | LB2 | LB3 | LB4 | LB5 |
|------|-----|-----|-----|-----|-----|
| DL12 | 0   | 0   | 0   | 0   | 0   |
| DL13 | 1   | 1   | 1   | 1   | 0   |
| DL14 | 0   | 0   | 0   | 1   | 1   |

PATH MANAGEMENT METHOD NUMBER;
 1: LABEL FOR ADP SET PATH
 0: LABEL FOR MANUALLY SET PATH

FIG. 3

LABEL MANAGEMENT INFORMATION
STORAGE SECTION 15

|      | LB1 | LB2 | LB3 | LB4 | LB5 |
|------|-----|-----|-----|-----|-----|
| DL12 | 1   | 0   | 0   | 0   | 0   |
| DL13 | 0   | 0   | 1   | 1   | 0   |
| DL14 | 0   | 0   | 1   | 1   | 1   |

LABEL USE STATE;
1: IN USE
0: UNUSED

FIG. 4

PATH MANAGEMENT INFORMATION
STORAGE SECTION 16

| PATH ID | INPUT INFORMATION | | OUTPUT INFORMATION | |
|---------|------|-------|------|-------|
| PATH 1  | DL12 | LB1   | DL14 | LB3   |
| PATH 2  | DL13 | LB3,4 | DL14 | LB4,5 |

PATH SETTING LABEL INFORMATION
STORAGE SECTION 14

|          | LB1 | LB2 | LB3 | LB4 | LB5 |
|----------|-----|-----|-----|-----|-----|
| LINK L01 | 1   | 0   | 2   | 2   | 2   |
| LINK L02 | 0   | 0   | 1   | 1   | 1   |
| LINK L03 | 0   | 1   | 0   | 1   | 1   |

PATH MANAGEMENT METHOD NUMBER;
 0: LABEL FOR MANUALLY SET PATH
 1: LABEL FOR ADP SET PATH
 2: SHARED LABEL

FIG. 15

PATH SETTING LABEL INFORMATION
STORAGE SECTION 14

|          | LB1 | LB2 | LB3 | LB4 | LB5 |
|----------|-----|-----|-----|-----|-----|
| LINK L01 | 1   | 0   | 2   | 2   | 2   |
| LINK L02 | 3   | 3   | 1   | 1   | 1   |
| LINK L03 | 0   | 1   | 0   | 1   | 1   |

PATH MANAGEMENT METHOD NUMBER;
 0: LABEL FOR POLICY 0
 1: LABEL FOR POLICY 1
 2: LABEL FOR POLICY 2
 3: SHARED LABEL

FIG. 16

NODE DEVICE AND LABEL MANAGEMENT METHOD IN OPTICAL TRANSMISSION NETWORK

This application is based upon and claims the benefit of priority from Japanese Patent Application No. 2007-175705, filed on Jul. 4, 2007, the disclosure of which is incorporated herein in its entirety by reference.

BACKGROUND OF THE INVENTION

1. Field of the Invention

The present invention relates to a node device in an optical transmission network as well as a label management method and program used in the same and, more particularly, to a method for managing labels (e.g., time slots and wavelengths) in an environment where a path that is set manually and a path that is set through an autonomous decentralized protocol coexist.

2. Description of the Related Art

In an optical transmission network, an operator manually sets a path (hereinafter, such a path will be referred to as "manually set path"). However, to achieve more efficient operation and more efficient use of network resources, it is regarded as a scheme of promise to set a path through an autonomous decentralized protocol (ADP) such as generalized multi-protocol label switching (GMPLS) or an automatically switched optical network (ASON). Hereinafter, such a path that is set through ADP will be referred to as "ADP set path".

Here, setting a path (path setting) means reserving a time slot and/or a wavelength along the route of a path that is desired to be set. In this meaning, a timeslot and a wavelength are referred to as a label.

The manually set path has the disadvantage that path setting is complicated because the setting is performed through centralized control by a network management system (NMS), but has the advantage that a path can be set as intended by an operator.

On the other hand, the ADP set path has the advantages of easy path setting and good efficiency in the use of network resources because the setting is performed through autonomous decentralized processing. However, there is a drawback that it is difficult to set a path reflecting the intention of an operator.

In the light of the foregoing, it has been considered to take the respective advantages by allowing a manually set path and an ADP set path to coexist in an optical transmission network including SONET (Synchronous Optical NETwork)/SDH (Synchronous Digital Hierarchy) devices, wavelength division multiplexing (WDM) devices, and the like.

Incidentally, GMPLS is disclosed in Japanese Patent Application Unexamined Publication Nos. 2006-352297 and 2004-179894.

However, in the case where a manually set path and an ADP set path coexist, the problem is that there is no means for distinguishing between a label to be used for the manually set path and a label to be used for the ADP set path.

As a result, there arise a problem that labels in the network are consumed by an ADP set path and consequently a manually set path cannot be set, and a problem that, conversely, labels in the network are consumed by a manually set path and consequently an ADP set path cannot be set. These problems cannot be solved by the techniques disclosed in the above-mentioned Japanese Patent Application Unexamined Publication Nos. 2006-352297 and 2004-179894.

SUMMARY OF THE INVENTION

Accordingly, an object of the present invention is to solve the above-mentioned problems and to provide a node device as well as a label management method and program used in the same, wherein the node device can prevent a situation in which a path cannot be set in an optical transmission network.

According to the present invention, a node device in an optical transmission network where a manually set path and an ADP (autonomous decentralized protocol) set path coexist, wherein the manually set path is set by centralized control and the ADP set path is set by autonomous decentralized processing, includes: a label memory for storing at least first labels used for manually set paths and second labels used for ADP set paths, wherein the first and second labels previously defined before path setting; and a resource manager for setting a manually set path and an ADP set path by referring to contents stored in the label memory.

According to another aspect of the present invention, a label management method of a node device in an optical transmission network where a manually set path and an ADP (autonomous decentralized protocol) set path coexist, wherein the manually set path is set by centralized control and the ADP set path is set by autonomous decentralized processing, the method includes: storing at least first labels used for manually set paths and second labels used for ADP set paths in a label memory, wherein the first and second labels previously defined before path setting; and setting a manually set path and an ADP set path by referring to contents stored in the label memory.

According to still another aspect of the present invention, a computer-readable program for instructing a computer to perform label management of a node device in an optical transmission network where a manually set path and an ADP (autonomous decentralized protocol) set path coexist, wherein the manually set path is set by centralized control and the ADP set path is set by autonomous decentralized processing, the program includes: a function of storing at least first labels used for manually set paths and second labels used for ADP set paths in a label memory, wherein the first and second labels previously defined before path setting; and a function of setting a manually set path and an ADP set path by referring to contents stored in the label memory.

According to the present invention, by virtue of the above-described configuration and operations, the effect can be obtained that it is possible to distinguish between a label to be used for a manually set path and a label to be used for an ADP set path and to prevent a situation in which a path cannot be set.

DETAILED DESCRIPTION OF THE PREFERRED EMBODIMENTS

Next, exemplary embodiments of the present invention will be described with reference to the accompanying drawings.

1. First Exemplary Embodiment 1.1) Node Device

Figure 1:
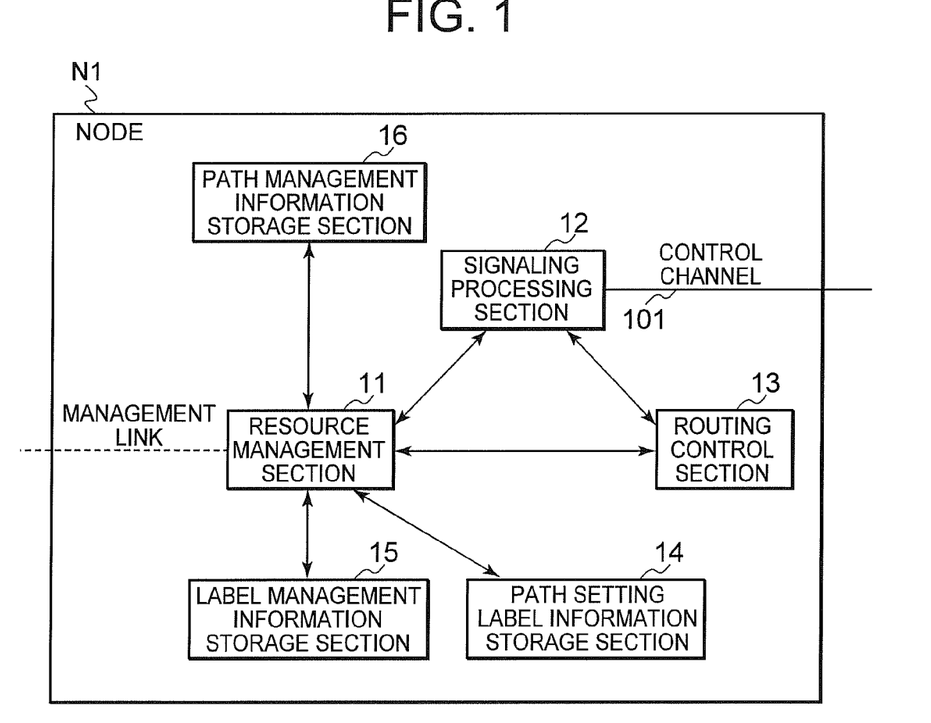
FIG. 1 is a block diagram showing an example of the structure of a node device according to a first exemplary embodiment of the present invention.
Figure 2:
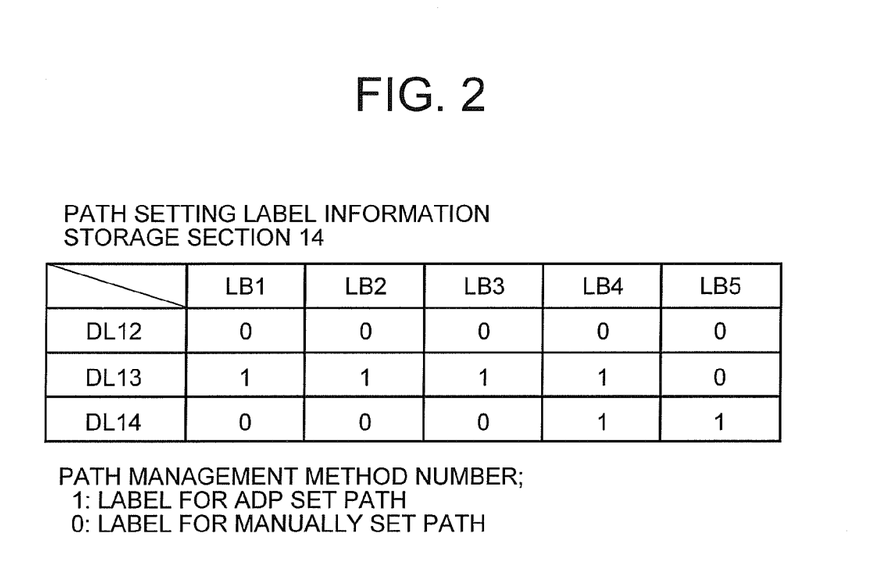
FIG. 2 is a diagram showing an example of the structure of a path setting label information storage section shown in FIG. 1.
Figure 3:
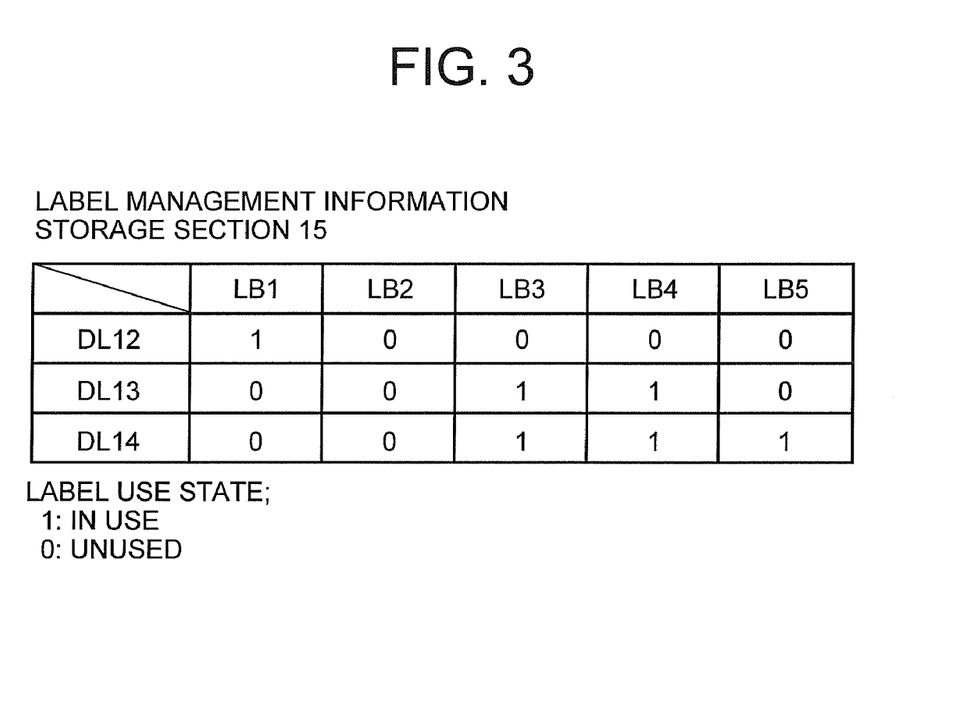
FIG. 3 is a diagram showing an example of the structure of a label management information storage section shown in FIG. 1.
Figure 4:
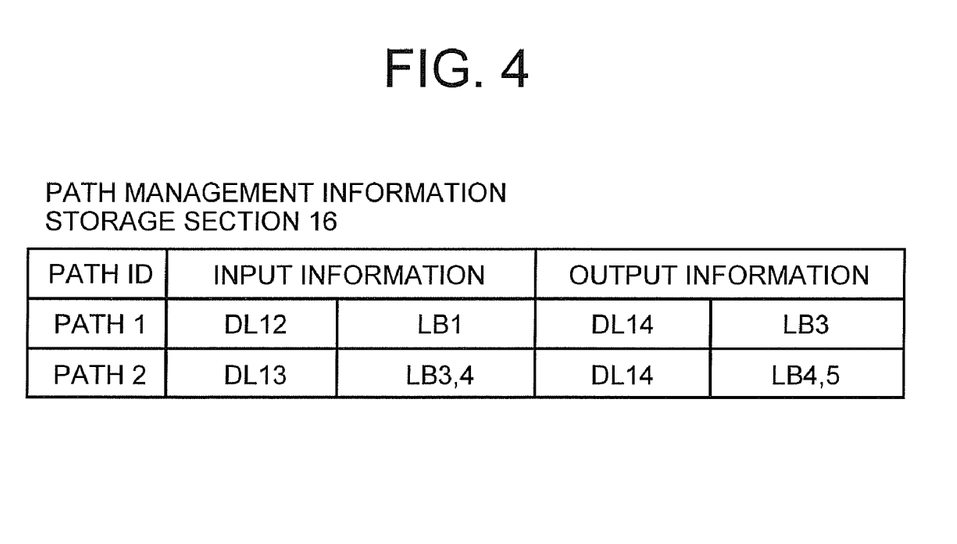
FIG. 4 is a diagram showing an example of the structure of a path management information storage section shown in FIG. 1.

FIG. 1 is a block diagram showing an example of the configuration of a node device according to a first exemplary embodiment of the present invention. FIG. 2 is a diagram showing an example of the structure of a path setting label information storage section shown in FIG. 1. FIG. 3 is a diagram showing an example of the structure of a label management information storage section shown in FIG. 1. FIG. 4 is a diagram showing an example of the structure of a path management information storage section shown in FIG. 1.

Referring to FIG. 1, a node device N1 includes a resource management section 11, a signaling processing section 12, a routing control section 13, a path setting label information storage section 14, a label management information storage section 15, and a path management information storage section 16.

According to the present exemplary embodiment, the path setting label information storage section 14 is provided, and the resource management section 11, in conjunction with the path setting label information storage section 14, can distinguish between a label to be used for a path that is set manually (hereinafter, such a path will be referred to as "manually set path") and a label to be used for a path that is set through an autonomous decentralized protocol (ADP) such as GMPLS/ASON (hereinafter, such a path will be referred to as "ADP set path").

Note that, in FIGS. 2 to 4, LBs represent time slot numbers of TDM (time division multiplexing) or wavelength numbers of WDM (wavelength division multiplexing), and DLs represent data links.

The resource management section 11 manages the path setting label information storage section 14, label management information storage section 15, and path management information storage section 16. The signaling processing section 12 processes signaling messages related to the autonomous decentralized protocol such as GMPLS/ASON. The routing control section 13 performs routing control related to the autonomous decentralized protocol such as GMPLS/ASON.

The path setting label information storage section 14 defines labels to be used for manually set paths and labels to be used for ADP set paths, as shown in FIG. 2. In FIG. 2, a label that can be reserved for a manually set path is denoted by "0," and a label that can be reserved for an ADP set path is denoted by "1."

The label management information storage section 15 manages the use states of the labels (time slots or wavelengths) of each link connected to the node device N1, as shown in FIG. 3. In FIG. 3, "1" is input if the label is being used by path setting, and "0" is input if the label is unused.

The path management information storage section 16 stores path information for a switching operation of the node device N1, as shown in FIG. 4. In FIG. 4, input link numbers and input labels are retained as input information, and output link numbers and output labels are retained as output information. The node device N1 performs switching on a path based on the path information stored in the path management information storage section 16.

Returning to FIG. 1, a control channel 101 is a communication link through which the node device N1 exchanges messages related to the autonomous decentralized protocol such as GMPLS/ASON with a neighboring node.

1.2) Optical Transmission Network

Figure 5:
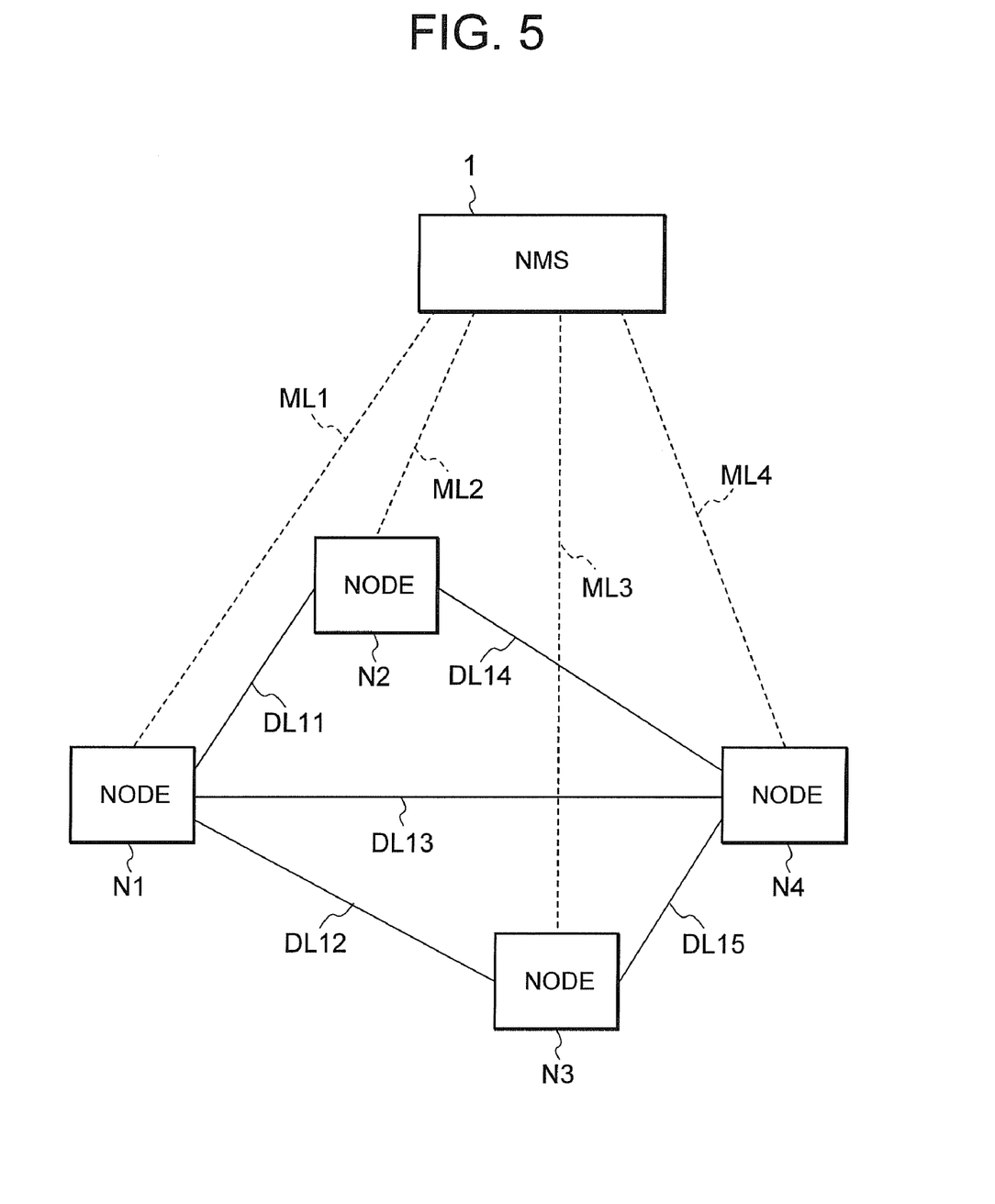
FIG. 5 is a block diagram showing an example of the structure of an optical transmission network according to the first exemplary embodiment of the present invention.

FIG. 5 is a block diagram showing an example of the structure of an optical transmission network according to the first exemplary embodiment of the present invention. The optical transmission network according to the first exemplary embodiment of the present invention includes SONET/SDH devices, WDM devices, and the like, and provides end-to-end paths through TDM and/or WDM technologies and others.

Referring to FIG. 5, each of node devices N1 to N4 represents a TDM node or a WDM node. A TDM node has an ability to perform switching every time slot, in addition to a function of multiplexing and demultiplexing time slots. A WDM node has an ability to perform switching every wavelength, in addition to a function of multiplexing and demultiplexing wavelengths.

The node devices N1 to N4 are connected directly or indirectly through one or more of data links (optical fiber lines) DL11 to DL15. The node devices N1 to N4 are connected to a network management system (NMS) 1 through management links ML1 to ML4, respectively.

The NMS 1 has a function of making a path setting/deletion request to each of the node devices N1 to N4, a function of monitoring each of the node devices N1 to N4 for a failure, and the like. The NMS 1 is a system serving as an interface between an operator (a person at work) and the optical transmission network. The NMS 1 is connected to the individual node devices N1 to N4 through the management links ML1 to ML4, respectively, and the NMS 1 makes settings on the individual node devices N1 to N4 through the management links ML1 to ML4, respectively. In the present exemplary embodiment, it is assumed that a label represents a time slot or wavelength.

A manually set path is a path of a centralized control type that an operator establishes through the NMS 1 by designating all node devices N1 to N4 present along the routes in the optical transmission network. Based on path setting, the NMS 1 sets a switch and a label (time slot or wavelength) to be used for the path, on each of the node devices N1 to N4 through the corresponding one of the management links ML1 to ML4, thereby opening the path.

Note that, although not shown in FIG. 5, each of the node devices N1 to N4 has a similar structure to the node device N1 as shown in FIGS. 1 to 4.

1.3) Label Management

Figure 6:
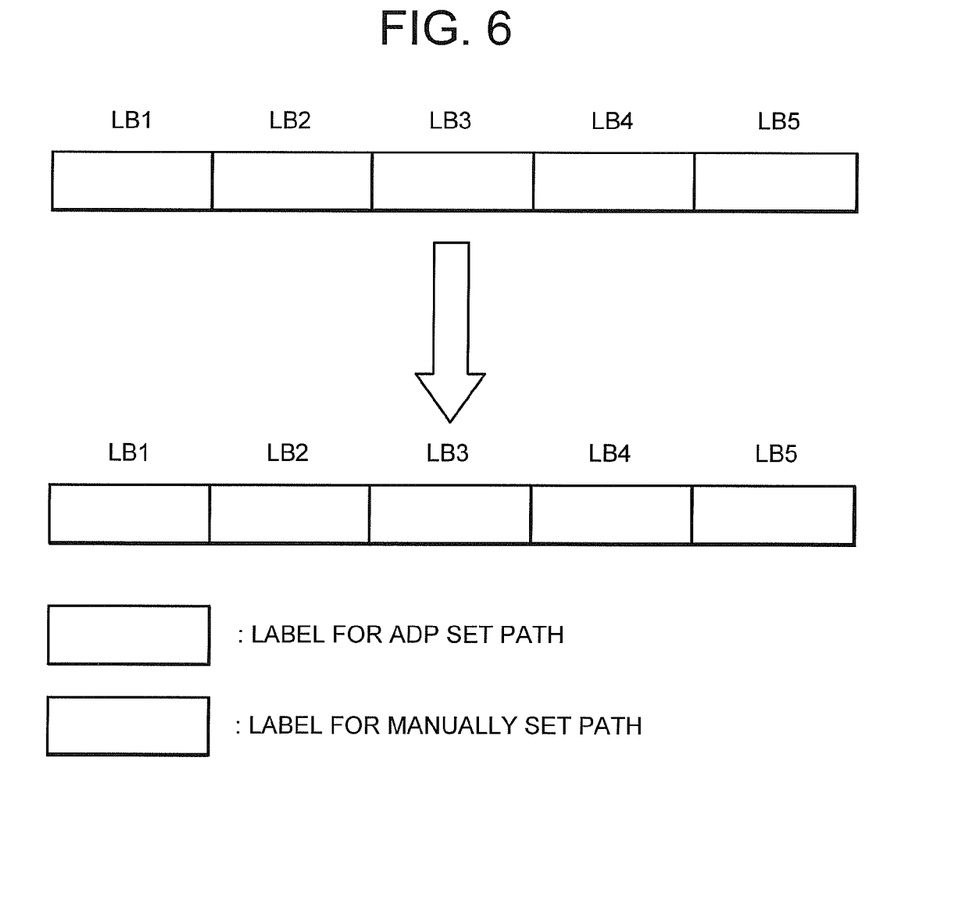
FIG. 6 is a diagram schematically showing label management according to the first exemplary embodiment of the present invention.
Figure 7:
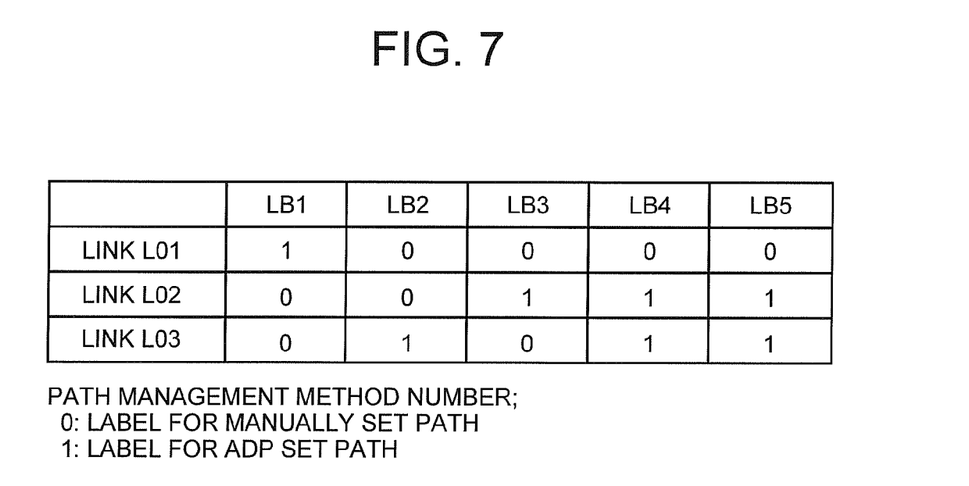
FIG. 7 is a diagram showing another example of the structure of the path setting label information storage section used in the first exemplary embodiment of the present invention.

FIG. 6 is a diagram showing an image of label management according to the first exemplary embodiment of the present invention. FIG. 7 is a diagram showing another example of the structure of the path setting label information storage section used in the first exemplary embodiment of the present invention.

According to the first exemplary embodiment, it is possible to distinguish between a label to be used for a manually set path and a label to be used for an ADP set path in an optical transmission network and it is also possible to dynamically change the labels.

FIG. 6 schematically shows labels to be used for a manually set path and labels to be used for an ADP set path. In FIG. 6, a shaded part represents labels that can be used for an ADP set path, and a blank part represents labels that can be used for a manually set path.

Each of the nodes devices N1 to N4 is provided with the path setting label information storage section 14 as shown in FIG. 7 and manages information about labels to be used for a manually set path and labels to be used for an ADP set path.

According to the present exemplary embodiment, labels to be used for a manually set path and labels to be used for an ADP set path are defined in the path setting label information storage section 14 prior to path setting, whereby it is possible to distinguish between a label to be used for a manually set path and a label to be used for an ADP set path.

The ADP set path is a path that is set by using an autonomous decentralized protocol (ADP) such as GMPLS/ASON. An operator or external system designates, through the NMS 1, a start-point node and an end-point node of a path to establish, and requests to set the path. Each of the node devices N1 to N4 carries out routing control and signaling in an autonomous and decentralized manner, whereby the path between the designated start-point node and end-point node is established.

1.4) Path Setting Operation

Operations of the optical transmission network according to the present exemplary embodiment will be described with reference to FIGS. 1 to 13.

To define labels to be used for a manually set path and labels to be used for an ADP set path, an operator makes settings on the path setting label information storage section 14 of each of the node devices N1 to N4.

In the path setting label information storage section 14 shown in FIG. 2, all the labels of the data link DL12 are assigned as labels for a manually set path. As to the data link DL13, the labels LB1 to LB4 are assigned as labels for an ADP set path, and the label LB5 is assigned as a label for a manually set path. As for the data link DL14, the labels LB4 and LB5 are assigned as labels for an ADP set path, and the other labels LB1 to LB3 are assigned as labels for a manually set path.

Next, description will be given of the operation of setting a manually set path and the operation of setting an ADP set path through an autonomous decentralized protocol such as GMPLS/ASON.

1.4.1) Manually Set Path

Figure 8:
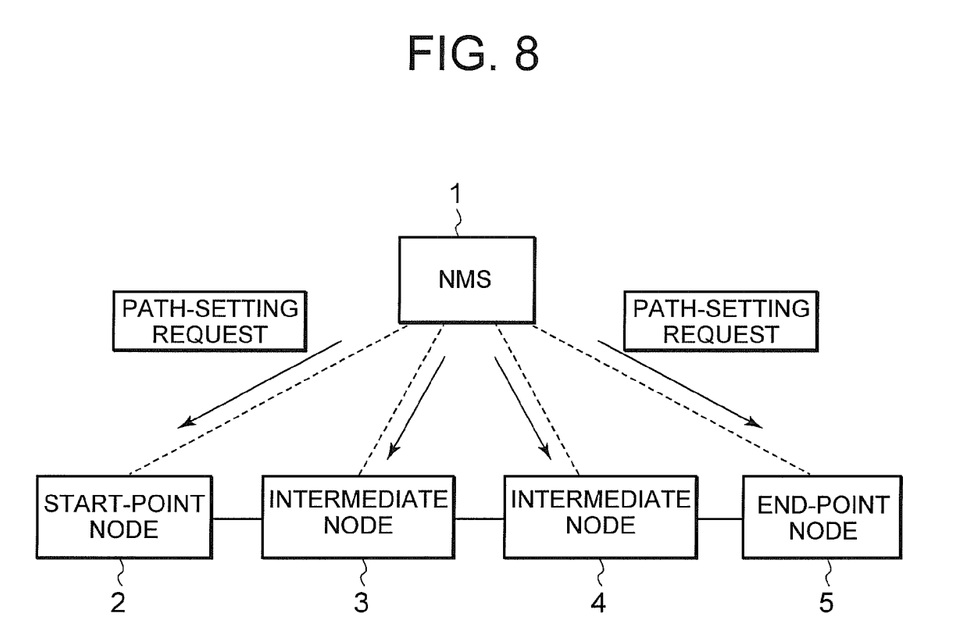
FIG. 8 is a diagram schematically showing path-setting requests made when a manually set path is established according to the first exemplary embodiment of the present invention.

As shown in FIG. 8, it is assumed that each of a start-point node 2, intermediate nodes 3 and 4, and an end-point node 5 is connected to a NMS 1 through a management link (a signal line represented by a broken line in FIG. 8).

First, in the case of the operation of setting a manually set path, an operator makes a path-setting request, through the NMS 1, to every one of the node devices (the start-point node 2, intermediate nodes 3 and 4, and end-point node 5) present along a route over which the operator desires to establish a path. With the path-setting request as shown by arrows in FIG. 8, label reservation and switch setting are requested. The path is opened when label reservation and switch setting are complete in all the node devices on the path. Hereinafter, it is assumed that each node device has the circuit structure as shown in FIG. 1.

Figure 9:
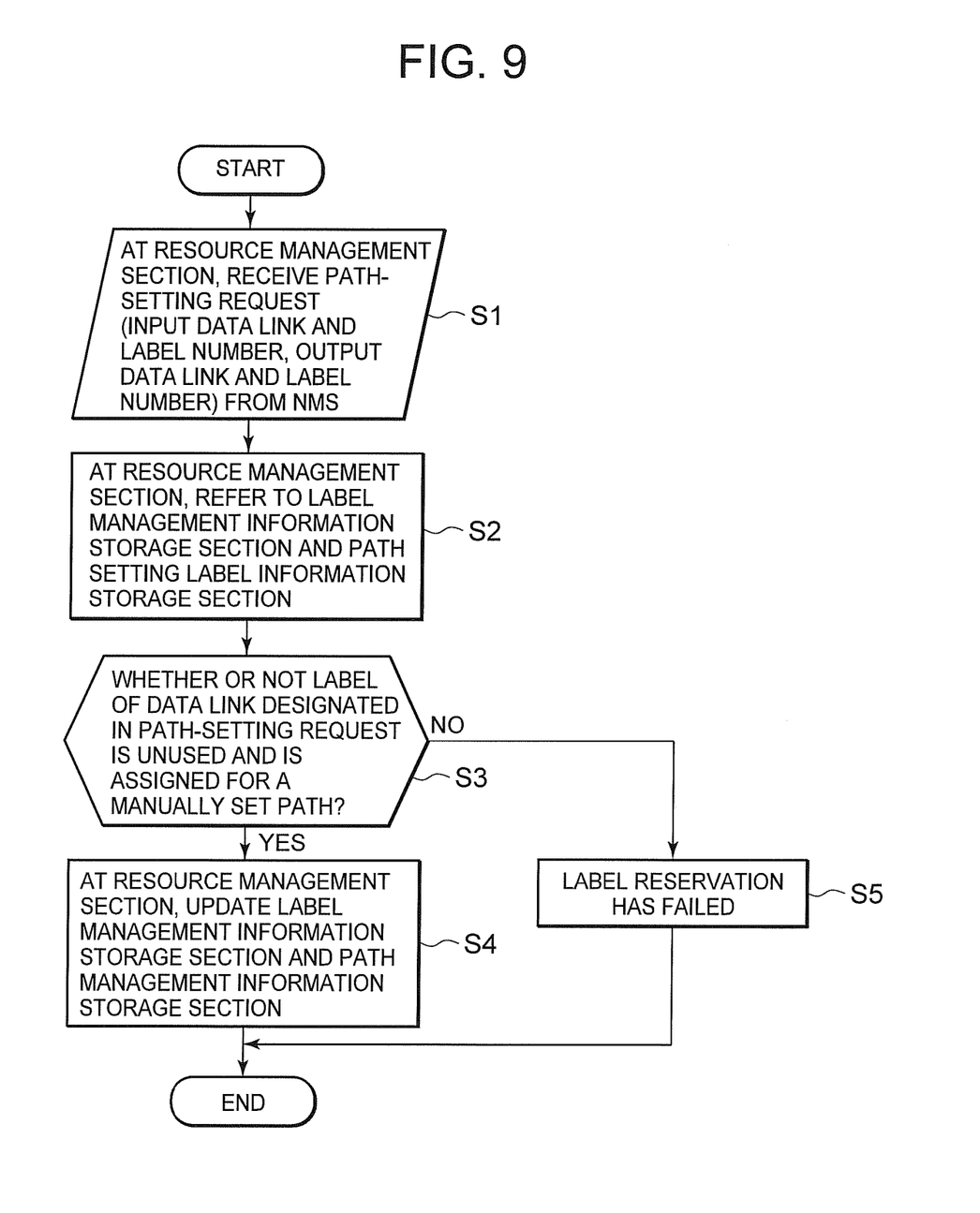
FIG. 9 is a flow chart showing an operation for setting a manually set path according to the first exemplary embodiment of the present invention.

FIG. 9 shows the operation of a node device upon receipt of a path-setting request from the NMS 1. In the node device, the resource management section 11 receives the path-setting request from the NMS 1 (Step S1). The path-setting request contains an input data link, input label number, output data link, and output label number.

Subsequently, the resource management section 11 refers to the label management information storage section 15 and the path setting label information storage section 14 (Step S2). When the label of the data link designated in the path-setting request is in use, or when the label in question is not a label for a manually set path (Step S3: NO), label reservation has failed (Step S5), and the resource management section 11 terminates the processing.

On the other hand, when the label of the data link designated in the path-setting request is unused, and also when the label in question is a label for a manually set path (Step S3: YES), the resource management section 11 updates the label management information storage section 15 and the path management information storage section 16 (Step S4), and then terminates the processing.

Figure 10:
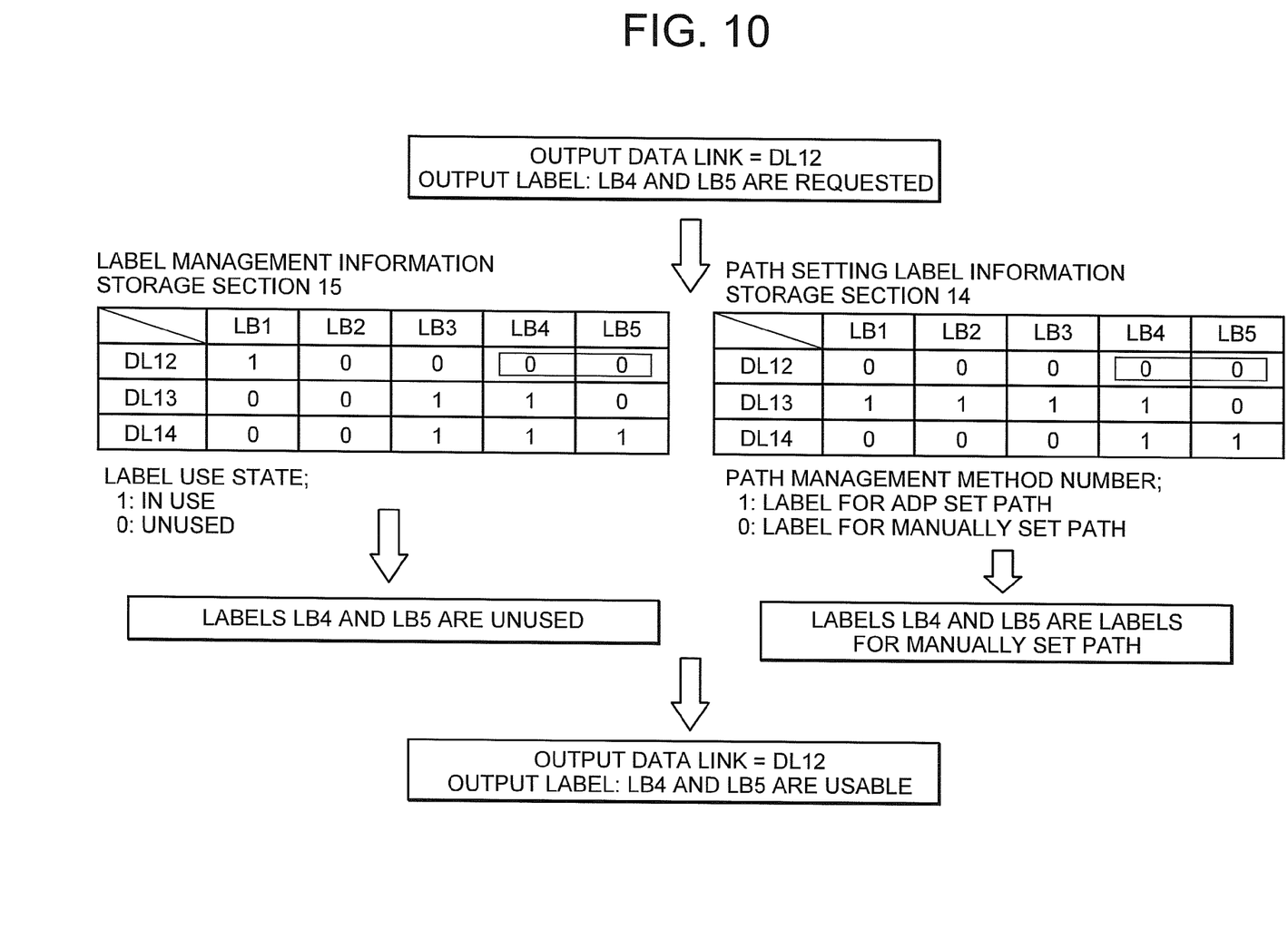
FIG. 10 is a diagram showing an example of the setting of a manually set path according to the first exemplary embodiment of the present invention.

Referring to FIG. 10, an example of the procedure of the above-described Steps S2 and S3 will be described. In this example, it is assumed that DL12 is designated as the output data link and LB4 and LB5 are designated as the output labels in the path-setting request.

The resource management section 11 refers to the label management information storage section 15 and confirms that the labels LB4 and LB5 of the data link DL12 are both unused. Moreover, the resource management section 11 refers to the path setting label information storage section 14 and confirms that the labels LB4 and LB5 of the data link DL12 are both assigned for a manually set path.

Thus, in the case where the labels LB4 and LB5 of the data link DL12 are both unused and dedicated to a manually set path, which is confirmed by referring to the label management information storage section 15 and path setting label information storage section 14, the resource management section 11 determines that both the labels LB4 and LB5 are usable.

1.4.2) ADP Set Path

Figure 11:
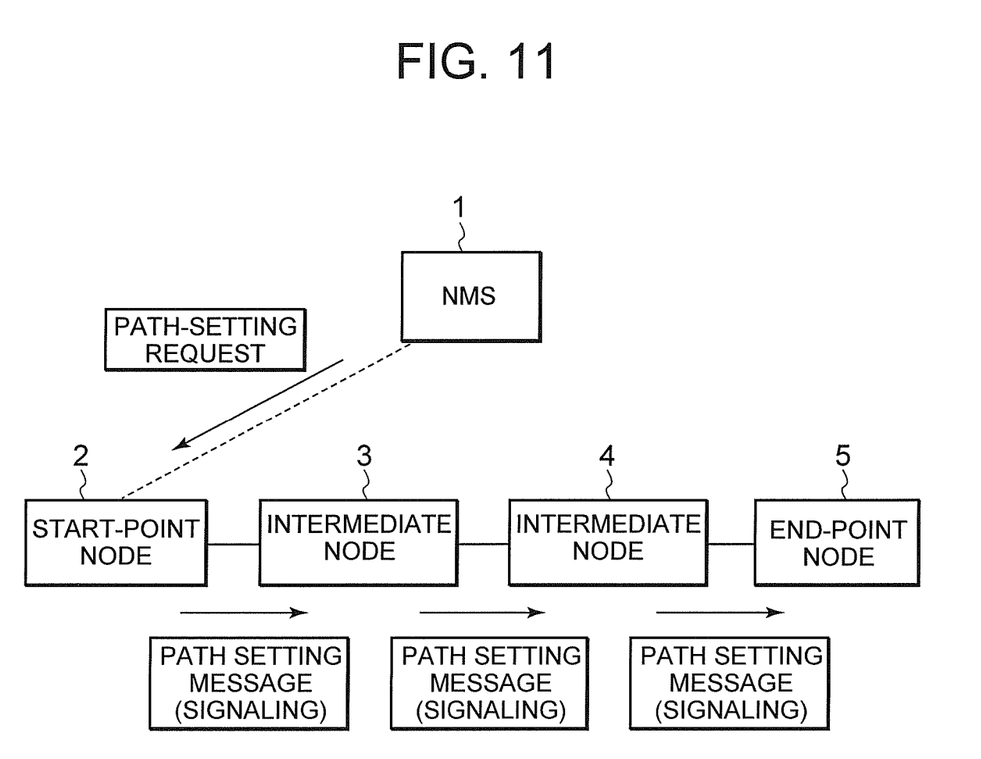
FIG. 11 is a diagram schematically showing a path-setting request made when an ADP set path is established according to the first exemplary embodiment of the present invention.
Figure 12:
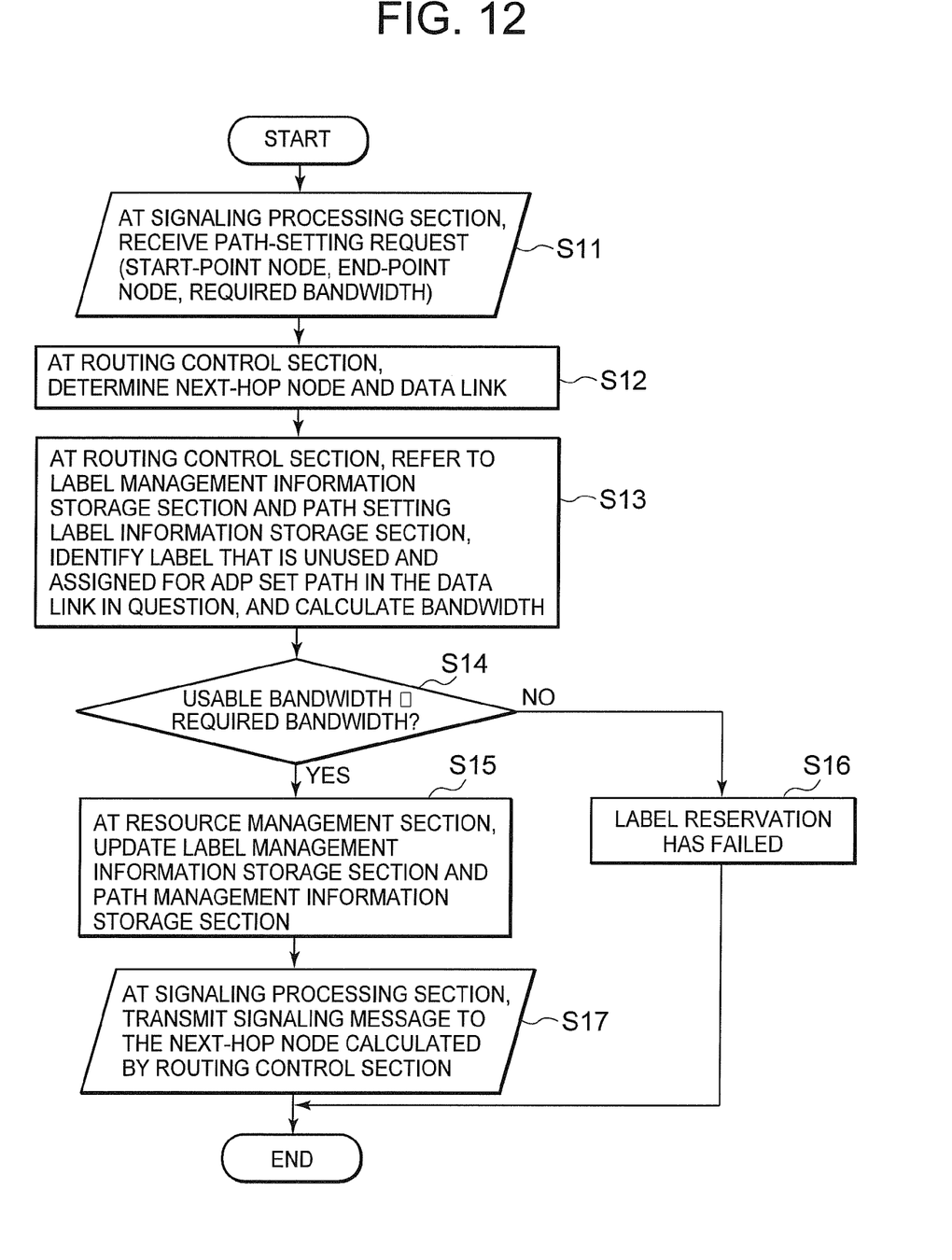
FIG. 12 is a flow chart showing operations for setting an ADP set path according to the first exemplary embodiment of the present invention.
Figure 13:
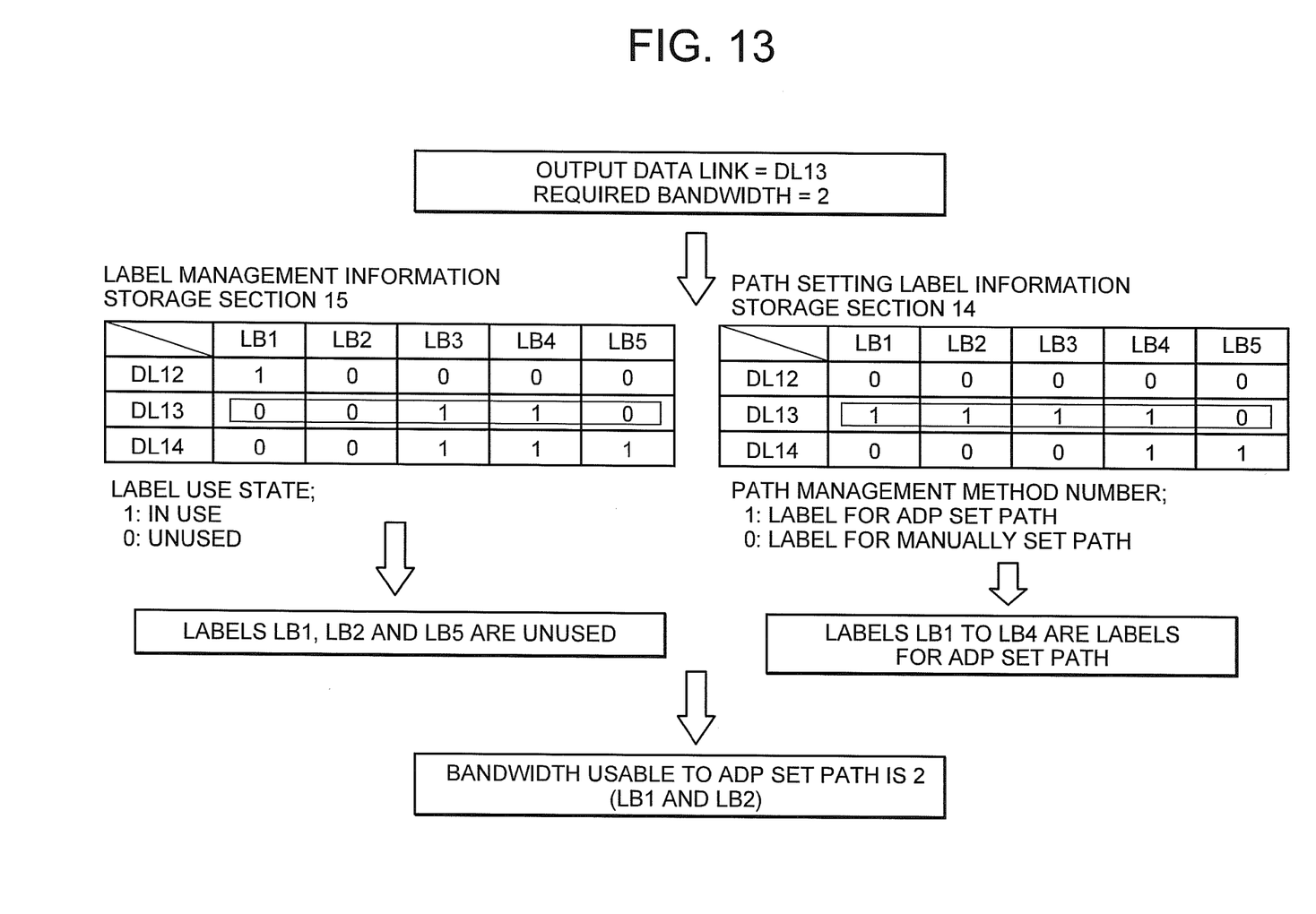
FIG. 13 is a diagram showing an example of the setting of an ADP set path according to the first exemplary embodiment of the present invention.

Referring to FIGS. 11-13, an operation of setting a path through an autonomous decentralized protocol such as GMPLS/ASON will be described.

As shown in FIG. 11, each node device (the start-point node 2, intermediate nodes 3 and 4, and end-point node 5) carries out routing control and signaling in an autonomous and decentralized manner, whereby a path between the designated start-point node 2 and end-point node 5 is established.

An operator or external system makes a path-setting request to the start-point node 2 through the NMS 1, designating the end-point node 5 of a path and a required bandwidth (the number of time slots or the number of wavelengths). Thereafter, signaling is carried out, starting from the start-point node 2, via the intermediate nodes 3 and 4, up to the end-point node 5. Then, each node device (the start-point node 2, intermediate nodes 3 and 4, and end-point node 5) carries out label reservation and switch setting, whereby the path is opened.

FIG. 12 shows the operation of a node device upon receipt of a path-setting request. In the node device, the signaling processing section 12 receives the path-setting request (Step S11). The path-setting request contains the addresses of the start-point node 2 and end-point node 5 of a path and the required bandwidth (the number of time slots or the number of wavelengths) of the path.

Subsequently, the routing control section 13 determines a node (next node) and data link to which a signaling message is next forwarded (Step S12). The resource management section 11 refers to the label management information storage section 15 and path setting label information storage section 14, identifies a label that is unused and assigned for an ADP set path among the labels of the data link determined by the routing control section 13, and calculates a usable bandwidth on the data link in question (Step S13).

In this event, when the calculated usable bandwidth is smaller than the bandwidth designated in the path-setting request (Step S14: NO), label reservation has failed (Step S16), and the resource management section 11 terminates the processing.

On the other hand, when the calculated usable bandwidth is equal to or wider than the bandwidth designated in the path-setting request (Step S14: YES), the resource management section 11 updates the label management information storage section 15 and path management information storage section 16 (Step S15).

Thereafter, the signaling processing section 12 transmits a signaling message to the next-hop node calculated by the routing control section 13 (Step S17), and the processing is terminated.

According to the present exemplary embodiment, the above-described flow is autonomously repeated, starting from the start-point node 2, next at each of the intermediate nodes 3 and 4, and finally at the end-node 5, whereby the path between the start-point node 2 and end-point node 5 is established. Note that at the end-point node 5, since there is no next node, the processing of transmitting a signaling message is not performed by the signaling processing section 12.

Referring to FIG. 13, an example of the procedure of the above-described Steps S13 and S14 will be described. In this example, it is assumed that DL13 is designated as the output data link and "2" is designated as the required bandwidth of the path in the path-setting request.

In the procedure of Step S13, the resource management section 11 refers to the label management information storage section 15 and checks the labels of the data link DL13 for availability. In this example, the labels LB1, LB2, and LB5 are available (unused) labels. Moreover, the resource management section 11 refers to the path setting label information storage section 14 and checks for a label that can be used for an ADP set path. In this example, the labels LB1 to LB4 are labels that can be used for an ADP set path.

Subsequently, among the labels of the data link DL13, the resource management section 11 identifies the labels LB1 and LB2 as labels that are unused and assigned for an ADP set path, resulting in a usable bandwidth of "2".

Next, in the procedure of Step S14, since the usable bandwidth is equal to or wider than the bandwidth designated in the path-setting request, the process moves to the next procedure of Step S15.

1.5) Effects

As described above, according to the first exemplary embodiment of the present invention, it is possible to distinguish between a label to be used for a manually set path and a label to be used for an ADP set path in an optical transmission network where a manually set path and an ADP set path coexist.

As a result, according to the present exemplary embodiment, it can be prevented that an ADP set path consumes so many labels that a manually set path cannot be set. Conversely, according to the present exemplary embodiment, it can also be prevented that a manually set path consumes so many labels that an ADP set path cannot be set. This is because the path setting label information storage section 14 manages labels to be used for a manually set path and labels to be used for an ADP set path.

2. Second Exemplary Embodiment

Figure 14:
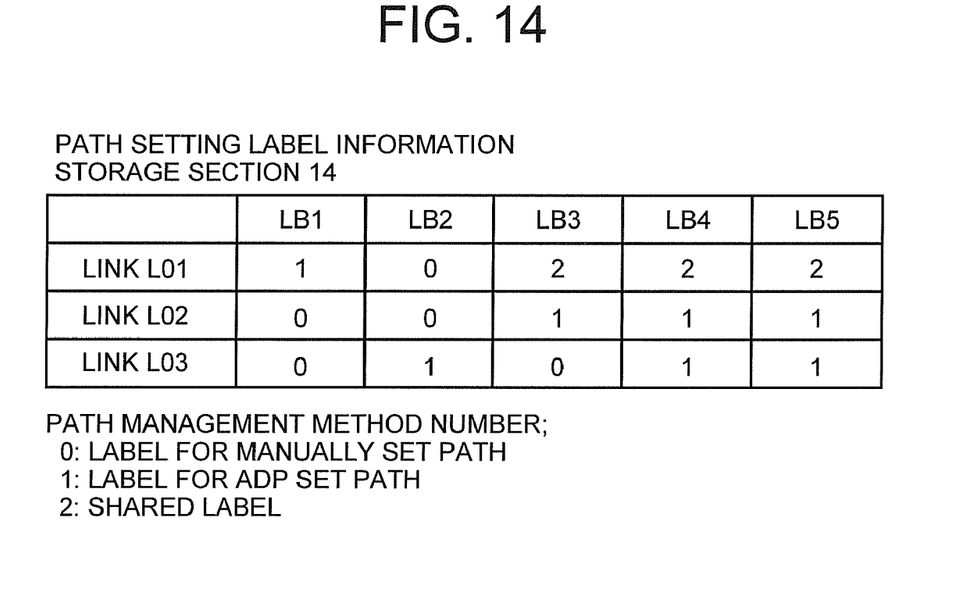
FIG. 14 is a diagram showing an example of the structure of a path setting label information storage section according to a second exemplary embodiment of the present invention.

FIG. 14 is a diagram showing an example of the structure of a path setting label information storage section according to a second exemplary embodiment of the present invention. According to the second exemplary embodiment, although the basic structure of the path setting label information storage section is similar to the path setting label information storage section in the first exemplary embodiment, a further improvement is made to the unit of label management.

Referring to FIG. 14, the path setting label information storage section 14 in a node device according to the second exemplary embodiment of the present invention defines labels to be used for a manually set path, labels to be used for an ADP set path, and shared labels. A shared label is a label that can be used for both a manually set path and an ADP set path.

As described above, according to the second exemplary embodiment, by further defining shared labels, it is possible to flexibly use labels, in addition to it being possible to distinguish between a label to be used for a manually set path and a label to be used for an ADP set path.

3. Third Exemplary Embodiment

Figure 15:
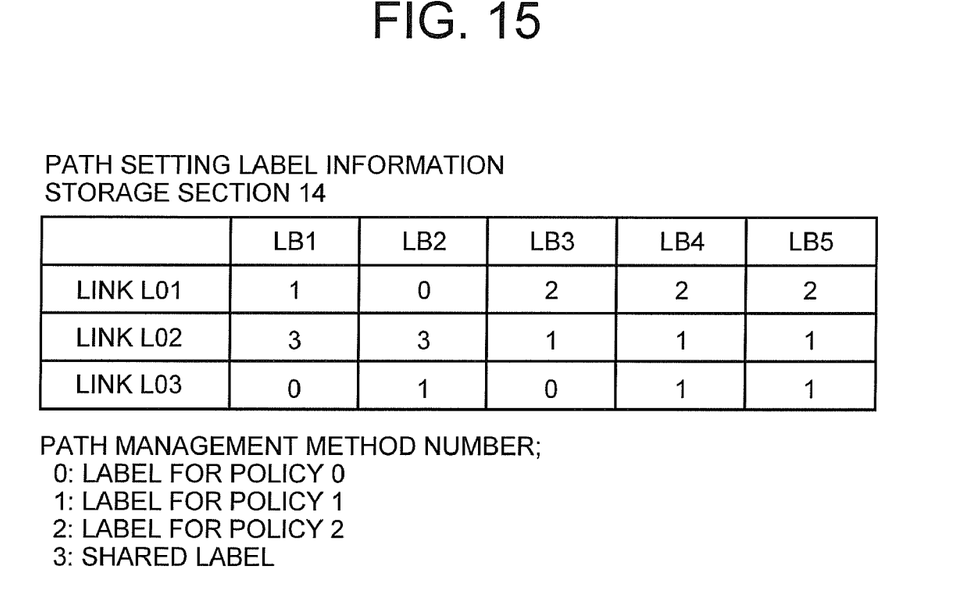
FIG. 15 is a diagram showing an example of the structure of a path setting label information storage section according to a third exemplary embodiment of the present invention.

FIG. 15 is a diagram showing an example of the structure of a path setting label information storage section according to a third exemplary embodiment of the present invention. According to the third exemplary embodiment, although the basic structure of the path setting label information storage section is similar to the path setting label information storage section in the first exemplary embodiment, a further improvement is made to the unit of label management.

Referring to FIG. 15, the path setting label information storage section 14 in a node device according to the third exemplary embodiment of the present invention defines labels and shared labels that can be used under respective ones of policies.

In this case, a shared label is defined as a label that can be used by a plurality of policies and a label other than the shared labels is defined as a label that can be used only for a certain policy.

A policy is defined as a condition under which a label can be used. For example, the following paths can be set in accordance with different policies.

Policy (1): a path having a certain node as the start point.
Policy (2): a path dedicated to a certain application (e.g., television broadcast application).
Policy (3): a manually set path.
Policy (4): an ADP set path.

In the case of the network as shown in FIG. 5, a plurality of paths having the node device N1 as the start point can be set under the policy (1).

As described above, according to the third exemplary embodiment, by the above-described method, it is possible to distinguish between labels used for respective ones of policies. In addition to this, by further defining a shared label, it is possible to flexibly use labels.

4. Fourth Exemplary Embodiment

Figure 16:
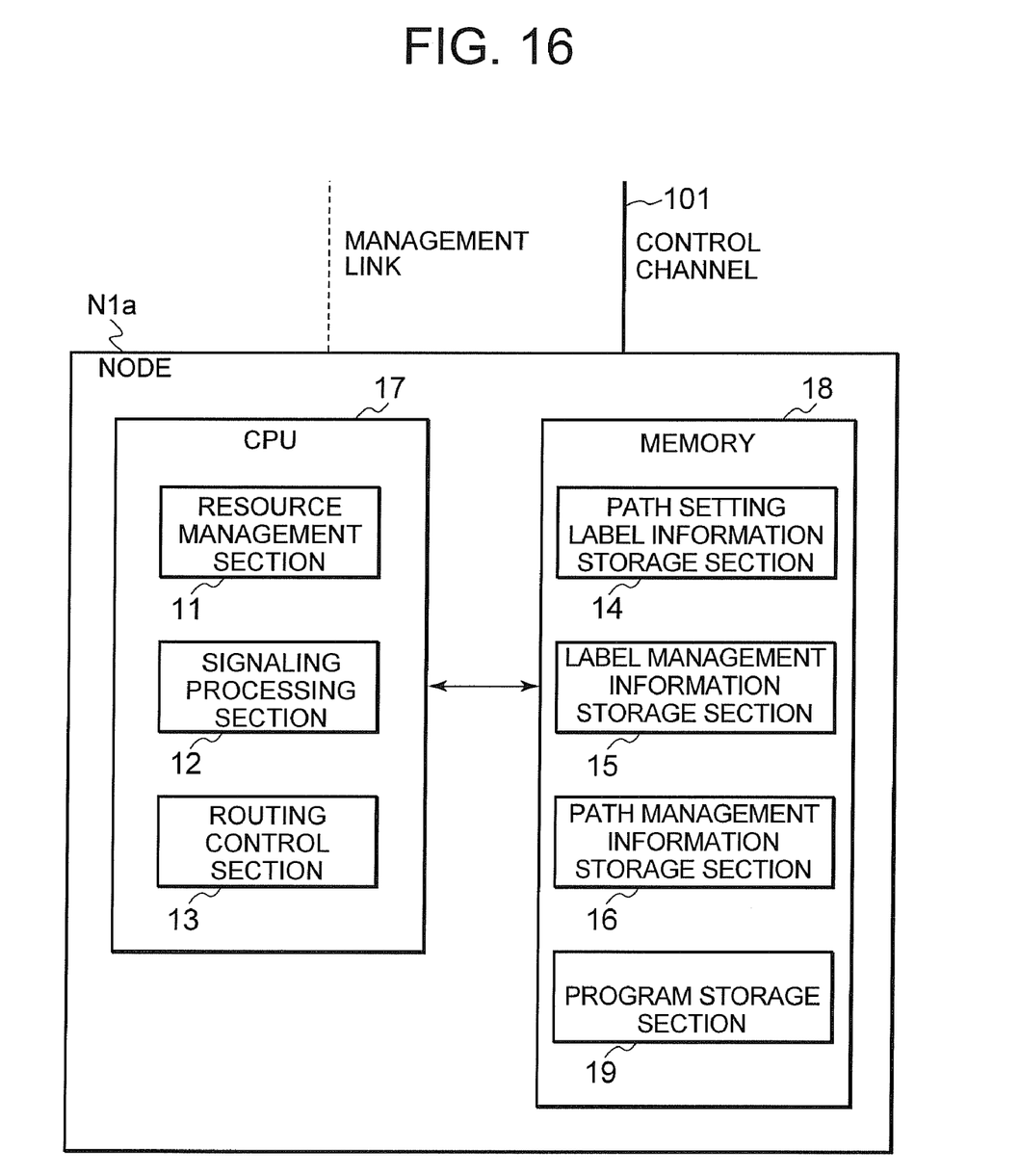
FIG. 16 is a block diagram showing an example of the configuration of a node device according to a fourth exemplary embodiment of the present invention.

FIG. 16 is a block diagram showing an example of the configuration of a node device according to a fourth exemplary embodiment of the present invention. Referring to FIG. 16, according to the fourth exemplary embodiment of the present invention, the processing (shown in FIGS. 9 and 12) performed by the resource management section 11, signaling processing section 12, and routing control section 13 of the node device according to the first exemplary embodiment as shown in FIG. 1 is implemented by a central processing unit (CPU) 17 executing programs stored in a program storage section 19 of a memory 18.

In this case, the memory 18 is provided with the program storage section 19 for storing the programs to be executed by the CPU 17, in addition to the path setting label information storage section 14, label management information storage section 15, and path management information storage section 16. Note that the path setting label information storage section 14 may store the contents according to any one of the first to third exemplary embodiments of the present invention.

According to the fourth exemplary embodiment, by the above-described method, it is possible to obtain the effects of any one of the first to third exemplary embodiments of the present invention, depending on the contents stored in the path setting label information storage section 14.

The present invention may be embodied in other specific forms without departing from the spirit or essential characteristics thereof. The above-described exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A node device in an optical transmission network where a manually set path and an ADP (autonomous decentralized protocol) set path coexist, wherein the manually set path is set by centralized control and the ADP set path is set by autonomous decentralized processing, the node device comprising:
    a label memory for storing at least first labels used for manually set paths and second labels used for ADP set paths, wherein the first and second labels previously defined before path setting; and
    a resource manager for setting a manually set path and an ADP set path by referring to contents stored in the label memory.

2. The node device according to claim 1, wherein, when one of a manually set path and an ADP set path is set, the resource manager searches the label memory for a corresponding one of a first label and a second label, which is available.

3. The node device according to claim 2, wherein, when a manually set path is set, the resource manager confirms that a first label usable for the manually set path exists in the label memory and, when an ADP set path is set, confirms that a second label usable for the ADP set path exists in the label memory.

4. The node device according to claim 1, wherein the label memory stores the first labels, the second labels, and shared labels which can be used for both a manually set path and an ADP set path.

5. The node device according to claim 2, wherein the label memory stores the first labels, the second labels, and shared labels which can be used for both a manually set path and an ADP set path.

6. The node device according to claim 1, wherein the label memory stores: labels which can be used for respective ones of policies; and shared labels, each of which can be used for a plurality of policies, wherein each policy allows path setting of at least one certain path.

7. The node device according to claim 2, wherein the label memory stores: labels which can be used for respective ones of policies; and shared labels, each of which can be used for a plurality of policies, wherein each policy allows path setting of at least one certain path.

8. The node device according to claim 1, further comprising:
    a label management information memory for storing information for managing use states of labels for each link connected to the node device,
    wherein the resource manager sets a manually set path and an ADP set path by referring to contents stored in the label memory and the label management information memory.

9. The node device according to claim 2, further comprising:
    a label management information memory for storing information for managing use states of labels for each link connected to node device,
    wherein the resource manager sets a manually set path and an ADP set path by referring to contents stored in the label memory and the label management information memory.

10. An optical transmission network including a plurality of node devices, wherein a manually set path and an ADP (autonomous decentralized protocol) set path coexist, wherein the manually set path is set by centralized control and the ADP set path is set by autonomous decentralized processing, wherein each of the node devices comprises:
    a label memory for storing at least first labels used for manually set paths and second labels used for ADP set paths, wherein the first and second labels previously defined before path setting; and
    a resource manager for setting a manually set path and an ADP set path by referring to contents stored in the label memory.

11. The optical transmission network according to claim 10, wherein when one of a manually set path and an ADP set path is set, the resource manager searches the label memory for a corresponding one of a first label and a second label, which is available.

12. The optical transmission network according to claim 11, wherein, when a manually set path is set, the resource manager confirms that a first label usable for the manually set path exists in the label memory and, when an ADP set path is set, confirms that a second label usable for the ADP set path exists in the label memory.

13. The optical transmission network according to claim 10, further comprising:
  a label management information memory for storing information for managing use states of labels for each link connected to the node device,
  wherein the resource manager sets a manually set path and an ADP set path by referring to contents stored in the label memory and the label management information memory.

14. The optical transmission network according to claim 11, further comprising:
  a label management information memory for storing information for managing use states of labels for each link connected to the node device,
  wherein the resource manager sets a manually set path and an ADP set path by referring to contents stored in the label memory and the label management information memory.

15. A label management method of a node device in an optical transmission network where a manually set path and an ADP (autonomous decentralized protocol) set path coexist, wherein the manually set path is set by centralized control and the ADP set path is set by autonomous decentralized processing, the method comprising:
  storing at least first labels used for manually set paths and second labels used for ADP set paths in a label memory, wherein the first and second labels previously defined before path setting; and
  setting a manually set path and an ADP set path by referring to contents stored in the label memory.

16. The label management method according to claim 15, wherein, when one of a manually set path and an ADP set path is set, the label memory is searched for a corresponding one of a first label and a second label, which is available.

17. The label management method according to claim 16, wherein, when a manually set path is set, it is confirmed that a first label usable for the manually set path exists in the label memory and, when an ADP set path is set, it is confirmed that a second label usable for the ADP set path exists in the label memory.

18. The label management method according to claim 15, wherein the label memory stores the first labels, the second labels, and shared labels which can be used for both a manually set path and an ADP set path.

19. The label management method according to claim 16, wherein the label memory stores the first labels, the second labels, and shared labels which can be used for both a manually set path and an ADP set path.

20. The label management method according to claim 15, wherein the label memory stores: labels which can be used for respective ones of policies; and shared labels, each of which can be used for a plurality of policies, wherein each policy allows path setting of at least one certain path.

21. The label management method according to claim 16, wherein the label memory stores: labels which can be used for respective ones of policies; and shared labels, each of which can be used for a plurality of policies, wherein each policy allows path setting of at least one certain path.

22. The label management method according to claim 15, further comprising:
  storing information for managing use states of labels for each link connected to node device in a label management information memory,
  wherein a manually set path and an ADP set path are set by referring to contents stored in the label memory and the label management information memory.

23. The label management method according to claim 16, further comprising:
  storing information for managing use states of labels for each link connected to node device in a label management information memory,
  wherein a manually set path and an ADP set path are set by referring to contents stored in the label memory and the label management information memory.

24. A non-transitory computer-readable medium on which a program is recorded, the program, when executed, causing a computer to perform label management of a node device in an optical transmission network where a manually set path and an ADP (autonomous decentralized protocol) set path coexist, wherein the manually set path is set by centralized control and the ADP set path is set by autonomous decentralized processing, the program, when executed, further causing the computer to:
  store at least first labels used for manually set paths and second labels used for ADP set paths in a label memory, wherein the first and second labels previously defined before path setting; and
  set a manually set path and an ADP set path by referring to contents stored in the label memory.

* * * * *